United States Patent
Kim et al.

(10) Patent No.: US 10,567,208 B2
(45) Date of Patent: Feb. 18, 2020

(54) COMMUNICATION DEVICE AND METHOD IN FILTER-BANK BASED SINGLE CARRIER FREQUENCY DIVISION MULTIPLE ACCESS SYSTEM

(71) Applicant: Samsung Electronics Co., Ltd, Gyeonggi-do (KR)

(72) Inventors: Kyeongyeon Kim, Gyeonggi-do (KR); Yeohun Yun, Gyeonggi-do (KR); Chanhong Kim, Gyeonggi-do (KR); Jiyun Seol, Gyeonggi-do (KR); Byunghwan Lee, Gyeonggi-do (KR); Ming Hoka, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 15/326,449

(22) PCT Filed: Apr. 28, 2016

(86) PCT No.: PCT/KR2016/004469
§ 371 (c)(1),
(2) Date: Jan. 13, 2017

(87) PCT Pub. No.: WO2016/175583
PCT Pub. Date: Nov. 3, 2016

(65) Prior Publication Data
US 2018/0212813 A1    Jul. 26, 2018

(30) Foreign Application Priority Data
Apr. 30, 2015 (KR) .......................... 10-2015-0061890

(51) Int. Cl.
*H04L 27/26* (2006.01)

(52) U.S. Cl.
CPC .......... *H04L 27/2698* (2013.01); *H04L 27/26* (2013.01); *H04L 27/265* (2013.01); *H04L 27/2614* (2013.01); *H04L 27/264* (2013.01)

(58) Field of Classification Search
CPC ............... H04L 27/2698; H04L 27/265; H04L 27/2614; H04L 27/264
See application file for complete search history.

(56) References Cited

U.S. PATENT DOCUMENTS

| 2005/0271152 A1 | 12/2005 | Kim et al. |
| 2007/0183520 A1* | 8/2007 | Kim ...................... H04L 1/0001 375/260 |

(Continued)

FOREIGN PATENT DOCUMENTS

| EP | 01603295 A2 | 12/2005 |
| KR | 20110127704 | 11/2011 |

(Continued)

OTHER PUBLICATIONS

International Search Report dated Jul. 26, 2016 in connection with International Application No. PCT/KR2016/004469, 7 pages.

(Continued)

*Primary Examiner* — Jean B Corrielus

(57) ABSTRACT

Disclosed is a 5G or pre-5G communication system to be provided for supporting a data transmission rate higher than that of a 4G communication system such as LTE. Particularly, the present invention relates to a communication device and method in a filter-bank based single carrier frequency division multiple access (FB based SC-FDMA) system and, particularly, to a communication device and method for lowering a peak to average power ratio (PAPR) in an uplink.

20 Claims, 13 Drawing Sheets

(56) References Cited

U.S. PATENT DOCUMENTS

| | | |
|---|---|---|
| 2011/0302230 A1 | 12/2011 | Ekstrand |
| 2014/0192925 A1* | 7/2014 | Li .......................... H04L 25/08 |
| | | 375/297 |
| 2014/0233437 A1 | 8/2014 | Abdoli et al. |
| 2015/0049836 A1 | 2/2015 | Li et al. |
| 2016/0057767 A1 | 2/2016 | Kim et al. |

FOREIGN PATENT DOCUMENTS

| | | |
|---|---|---|
| KR | 20140142312 | 12/2014 |
| WO | 2014168449 A1 | 10/2014 |

OTHER PUBLICATIONS

Written Opinion of the International Searching Authority dated Jul. 26, 2016 in connection with International Application No. PCT/KR2016/004469, 5 pages.

Behrouz Farhang-Boroujeny, "Filter Bank Multicarrier Modulation: A Waveform Candidate for 5G and Beyond", Advances in Electrical Engineering, vol. 2014, Article 1D 482805, Dec. 21, 2014, 27 pages.

\* cited by examiner

COMMUNICATION DEVICE AND METHOD IN FILTER-BANK BASED SINGLE CARRIER FREQUENCY DIVISION MULTIPLE ACCESS SYSTEM

TECHNICAL FIELD

The present invention relates to a communication apparatus and method for use in a Single Carrier Frequency Division Multiple Access (SC-FDMA) system based on Filter Bank (FB) (FB-based SC-FDMA system) and, in particular, to a communication apparatus and method for reducing Peak to Average Power Ratio (PAPR) in downlink.

BACKGROUND ART

With the rapid advance of electronic communication technologies, radio communication devices have become part of everyday activities. Such radio communication devices use radio frequency resources. Radio communication networks have evolved from the legacy radio and TV broadcasting networks to mobile communication networks for supporting voice and data communication services in various fields including satellite communication and military communication.

In order to meet the increasing demand for wireless data traffic since the commercialization of 4G communication systems, the development focus has been on the $5^{th}$ Generation (5G) or pre-5G communication system. For this reason, the 5G or pre-5G communication system is called a beyond 4G network communication system or post Long Term Evolution (LTE) system.

To accomplish higher data rates, consideration is being given to implementing the 5G communication system in millimeter wave (mmWave) frequency bands (e.g., 60 GHz bands). In order to increase the propagation distance by mitigating propagation loss in the 5G communication system, discussions are underway about various techniques such as beamforming, massive MIMO, Full Dimensional MIMO (FD-MIMO), array antenna, analog beamforming, and large scale antenna.

Also, in order to enhance network performance of the 5G communication system, developments are underway of various techniques such as evolved small cell, advanced small cell, cloud Radio Access Network (RAN), ultra-dense network, Device to Device (D2D) communication, wireless backhaul, moving network, cooperative communication, Coordinated Multi-Points (CoMP), and interference cancellation.

Furthermore, the ongoing research includes the use of Hybrid FSK and QAM Modulation (FQAM) and Sliding Window Superposition Coding (SWSC) as Advanced Coding Modulation (ACM), Filter Bank Multi Carrier (FBMC), Non-Orthogonal Multiple Access (NOMA), and Sparse Code Multiple Access (SCMA).

Meanwhile, it is predicted that the number of wireless radio communication devices will increase exponentially with the advent of the Internet of Things (IoT) and Machine Type Communication (MTC). The growing number of radio communication devices aggravates radio resource constraints, resulting in limitations on the data rate per device. In order to prepare for such situations, there is increasing demand for a higher data rate in the wireless communication network.

The simplest way of providing services at higher data rates would be to consider extending the available frequency band of the radio communication network; however, in order to extend the available frequency band it is necessary to reallocate frequency bands for the different radio communication technologies, and frequency band reallocation has reached an unrealizable point.

The mobile communication technology is migrating from the $3^{rd}$ Generation (3G) to the $4^{th}$ Generation (4G) technology. However, as described above, there may be realization soon that the 4G mobile communication technology cannot accommodate both the increasing number of radio communication devices and higher data rate requirements.

There is therefore a need of a multiple access technology that is more efficient than the current Cyclic Prefix Orthogonal Frequency Division Multiplexing (CP-OFDM) in the beyond-4G mobile communication technology.

The aforementioned FBMC is one of the technologies capable of meeting the above requirements. The FBMC system adopts the OFDM scheme without use of Cyclic Prefix (CP). The FBMC system is capable of protecting against bandwidth waste caused by use of CP in the legacy OFDM system. The FBMC system is characterized by a high frequency confinement with per-subcarrier filtering, and this make it possible to expect a large gain by reducing the intra- and inter-communication band guard periods. In particular, the FBMC system may maximize gains in the case of supporting a large number of users or devices.

Meanwhile, a multicarrier system incurs multi-signal overlapping in the time domain because of signal splitting in the frequency domain, and the multi-signal overlapping in the time domain increases the Peak to Average Power Ratio (PAPR). Clipping and Precoding are promising methods proposed for reducing the PAPR in the multicarrier-based radio communication system. However, such methods have a drawback in terms of distorting the frequency spectrum characteristics and thus making it difficult to preserve the advantages of the FBMC system.

DISCLOSURE OF INVENTION

Technical Problem

The present invention provides an apparatus and method for reducing PAPR while maintaining the advantages of the FBMC in an FBMC-based multicarrier radio communication system.

Solution to Problem

In accordance with an aspect of the present invention, a transmission device of a filter bank mode multiple access radio communication system includes a modulation unit which modulates data to transmit into modulation symbols, a time resource mapping unit which maps the modulation symbols to time resources on a time axis at a predetermined interval according to an overlapping factor and a number of modulation symbols to transmit, a plurality of analysis filter banks which perform a reverse of a synthesis filter bank selected for transmitting the modulation symbols mapped to the time resources, a frequency resource mapping unit which maps symbols filtered by one of the analysis filter banks to pre-allocated frequency resources, at least one synthesis filter bank which synthesizes the symbols mapped to the frequency resources to recover a time domain signal, an overlap and sum unit which overlaps and sums outputs of the synthesis filter bank with a preconfigured overlapping factor, and a control unit which selects one analysis filter bank minimizing a self Signal to Interference Ratio (SIR) and a Peak to Average Power Ratio (PAPR) among the plurality of analysis filter banks.

In accordance with another aspect of the present invention, a data transmission method of a transmission device in a filter bank mode multiple access radio communication system includes modulating data to transmit into modulation symbols, mapping the modulation symbols to time resources on a time axis at a predetermined interval according to an overlapping factor and a number of modulation symbols to transmit, selecting one analysis filter bank minimizing a self Signal to Interference Ratio (SIR) and a Peak to Average Power Ratio (PAPR) among a plurality of analysis filter banks, performing a reverse operation of a synthesis filter bank selected for transmitting the modulation symbols mapped to the time resources, mapping symbols filtered by one of the analysis filter banks to pre-allocated frequency resources, synthesizing the symbols mapped to the frequency resources to recover a time domain signal, and overlapping and summing outputs of the synthesis filter bank with a preconfigured overlapping factor for transmission.

In accordance with another aspect of the present invention, a data transmission method of a transmission device of a filter bank mode multiple access radio communication system includes receiving scheduling information for transmitting data in response to a scheduling request transmitted to a base station, acquiring information on synthesis filter banks and allocated resources based on the scheduling information, selecting one analysis filter bank minimizing a self Signal to Interference Ratio (SIR) and a Peak to Average Power Ratio (PAPR) among a plurality of analysis filter banks performing reverse operations of the synthesis filter banks, mapping modulation symbols to time resources on the time axis at a predetermined interval according to an overlapping factor and amount of the modulation symbols, performing a reverse operation of the synthesis filter banks on the modulation symbols mapped to the timer resources using the selected analysis filter bank, mapping outputs of the analysis filter banks to predetermined frequency resources, recovering, at a selected synthesis filter bank, the time domain signals by synthesizing symbols mapped to the frequency resources, and overlapping and summing outputs of the synthesis filter banks with a preconfigured overlapping factor for transmission.

In accordance with still another aspect of the present invention, a device for transmitting data in a filter bank mode multiple access radio communication system includes a coder which encodes data to transmit; a modulation and transmission unit which modulates signals output from the coder into symbols, maps the modulation symbols to allocated resources, and converts the symbols to symbols suitable for transmission in the filter bank mode; and a control unit which controls a coding rate of the coder and selects filter banks minimizing a signal to interference ratio and a Peak to Average Power Ratio (PAPR) of the signal transmitted by the modulation and transmission unit in the filter bank mode, wherein the modulation and transmission unit includes a modulation unit which modulates the coded symbols into modulation symbols, a time resource mapping unit which maps the modulation symbols on the time axis at a predetermined interval according to an overlapping factor and amount of the modulation symbols to transmit, a plurality of analysis filter banks which performs a reverse operation of a synthesis filter bank selected for transmitting the modulation symbols mapped to the time resources, a frequency resource mapping unit which maps the symbols filtered by one of the analysis filter banks to pre-allocated frequency resources, a synthesis filter bank which recovers time domain signals by synthesizing the symbols mapped to the frequency resources, and an overlap and sum unit which overlaps and sums outputs of the synthesis filter bank.

Advantageous Effects of Invention

The present invention is advantageous in teams of reducing PAPR while maintaining the advantage (spectrum confinement) of the FBMC system. Also, the present invention is advantageous in terms of reducing PAPR by selecting adaptively only the analysis filter bank or both the synthesis filter bank and analysis filter band. Also, the present invention is advantageous in terms of using both the QAM-FBSC-FDMA and OQAM-FBSC-FDMA and being capable of increasing the data rate in the case of allocating frequency resources in a concentric manner in adaptation to the change of self SIR on the time axis. Also, the present invention is advantageous in teams of improving the data rate by allocating multiple MCS resources on the time axis in consideration of the self SIR and improving reception performance by allocating frequency resources in a concentric manner in adaptation to the change of the self SIR on the time axis. Also, the present invention is advantageous in terms of achieving diversity gain by changing channels on the time axis using a pattern shared between the base station and the terminal in consideration of the difference of self SIR displacements according to the analysis filter bank and transmitting on a single carrier in the QAM-FBMC system.

MODE FOR THE INVENTION

Exemplary embodiments of the present invention are described in detail with reference to the accompanying drawings. The same reference numbers are used throughout the drawings to refer to the same or like parts. The drawings are provided to help in understanding the present invention and are not intended to limit the present invention in shape and arrangement. Detailed descriptions of well-known functions and structures incorporated herein may be omitted to avoid obscuring the subject matter of the present invention. In the following, descriptions are made of only the parts necessary for understanding the operations in accordance with various embodiments of the present invention and are not made of the other parts to avoid obscuring the subject matter of the present invention.

In the following description, the present invention is directed to a method for reducing PAPR while maintaining the advantages of the FBMC-based radio communication system by transmitting data over a single carrier in spite of using the filter banks that are utilized in the FBMC-based wireless communication system. A description is made of the present invention with reference to the accompanying drawings.

Figure 1:
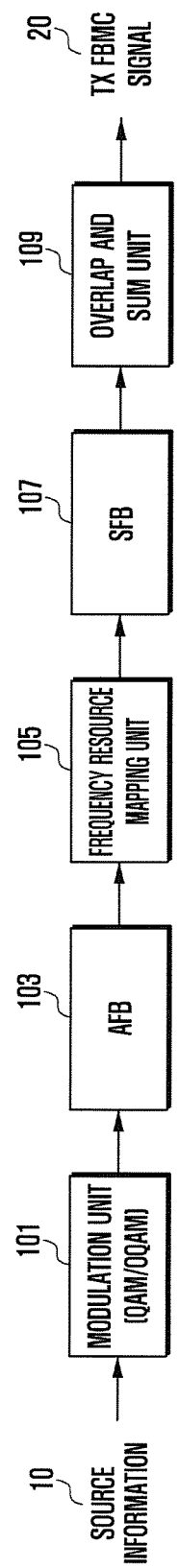
FIG. 1 is a block diagram illustrating a configuration of a transmission device for transmitting data over a single carrier in an FBMC-based radio communication system according to an embodiment of the present invention.

FIG. 1 is a block diagram illustrating a configuration of a transmission device for transmitting data over a single carrier in an FBMC-based radio communication system according to an embodiment of the present invention.

The source information 10 to be transmitted may be a coded symbol. Typically, the data (or symbol) to be transmitted or a signal to be transmitted for signaling may be coded in a predetermined coding scheme and then modulated. Accordingly, the source information 10 to be transmitted in FIG. 1 may be a coded signal (or symbol) in the following description, and the coded transmission data or the coded transmission signal is referred to as source information 10 for convenience of explanation. The source information 10 is input to the modulation unit 101 for application of the transmission scheme of the FBMC system thereto. The modulation unit 101 exemplified in FIG. 1 may use an OQAM scheme or a QAM scheme. It should be noted that the modulation unit 101 of FIG. 1 performs modulation in the OQAM scheme or QAM scheme in the following description.

The modulation unit 101 performs the OQAM or QAM scheme on the input source information 10 to output a modulated symbol. The modulated symbol output from the modulation unit 101 is input to the Analysis Filter Bank (AFB) 103. The AFB 103 performs filtering on the modulated symbol in a predetermined scheme for transmission over a single carrier. The filtering operation of the AFB 103 is described in more detail hereinafter.

The symbol filtered by the AFB 103 is input to the frequency resource mapping unit 105. The frequency resource mapping unit 105 maps the symbol filtered by the AFB 103 to a preconfigured or scheduled frequency resource. The symbol mapped to the frequency resource by the frequency resource mapping unit 105 is input to the Synthesis Filter Bank (SFB) 107. The SFB 107 performs synthesis on the symbol mapped to the frequency band, i.e. distributed to sub-bands, to recover the time domain signal. The filtering operation of the SFB 107 is described hereinafter in more detail.

The time domain symbol recovered by the SFB 107 is input to the overlap & sum unit 109 for generating the signal in the format for the FBMC system so as to be overlapped and summed according to the overlap factor configured in the FBMC system. The overlapped and summed signal is output as the transmission FBMC signal 20.

In FIG. 1, the SFB 107 may be the filter bank used in the normal FBMC-based radio communication system. That is, FIG. 1 shows that the present invention adds an AFB 103 before the SFB 107. By adding the AFB 103 before the SFB 107, it is possible to transmit data over a single carrier in the FBMC system.

Here, the AFB 103 is a filter bank for splitting the signal modulated in the QAM or OQAM scheme into sub-bands in the frequency domain and includes a Discrete Fourier Transform (DFT). Accordingly, the SFB 107 arranged after the AFB 103 synthesizes the symbol from sub-bands to recover the time domain symbol. Accordingly, the SFB 107 may operate as an Inverse Discrete Fourier Transform (IDFT).

When the SFB 107 performs IDFT on the signal DFT-ed by the AFB 103, the condition of equation (1) should be fulfilled to recover the so-called complete signal in the filter bank theory.

$$P_a P_s = I \qquad (1)$$

In equation (1), $P_a$ denotes the AFB 103 expressed as a matrix, and $P_s$ denotes the SFB 107 expressed as a matrix. In equation (1), I denotes the identity matrix.

As a result, equation (1) shows that if the AFB 103 and the SFB 107 are operated in cascade the result is output in the form of an impulse.

If equation (1) is considered on the basis of the normal filter bank theory, it can be thought that only one AFB can be used for recovering the signal completely when one SFB 107 is determined; however, in the real situation the FDT size for use at the AFB 103 and the IDFT size for use at the SFB 107 may differ from each other. Since the AFB 103 and the SFB 107 perform de-spreading and spreading operations respectively in the frequency domain as well as the frequency resource mapping unit 107 that is interposed between the AFB 103 and the SFB 107 taking charge of allocating frequency domain resources, it is not guaranteed that only one optimal AFB 103 exists in every case. In more detail, when one AFB 103 is determined, there may be two or more SFBs 107 fulfilling equation (1). In other words, when one SFB 107 is determined, there may be two or more AFBs 103 fulfilling equation (1) for the determined SFB.

By using the characteristic that the number of optimal AFBs is not always one, the method according to a preferred embodiment of the present invention is capable of using the AFBs selectively on the condition that the spectrum confinement is fulfilled.

In the FBMC-based radio communication system, if the resources are allocated closely in the frequency domain, typically the self Signal to Interference Ratio (SIR) is changed in the time domain. A preferred embodiment of the present invention provides a method for achieving diversity gain by allocating resources in the time domain or changing the AFB.

The present invention also proposes a configuration of a QAM-FBMC-based transmitter for transmitting a signal modulated in a QAM scheme with two or more prototype filters for single carrier transmission. Descriptions are made hereinafter with reference to FIGS. 2A and 2B of the transmission devices capable of accomplishing the preferred embodiments of the present invention.

Figure 2A:
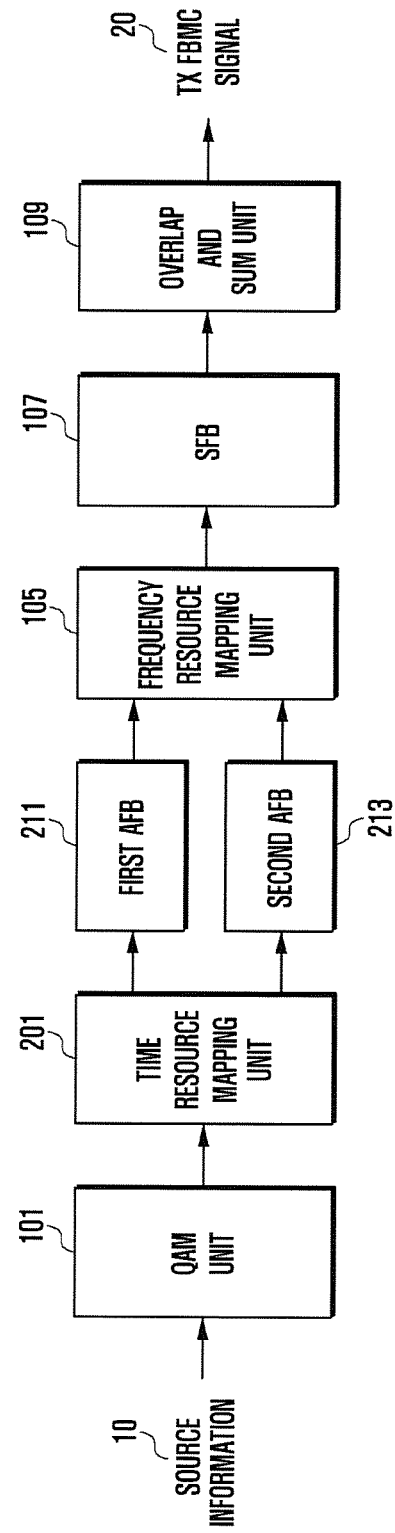
FIGS. 2A and 2B are block diagrams of transmission devices for QAM-FBMC scheme-based single carrier transmission according to the present invention.
Figure 2B:
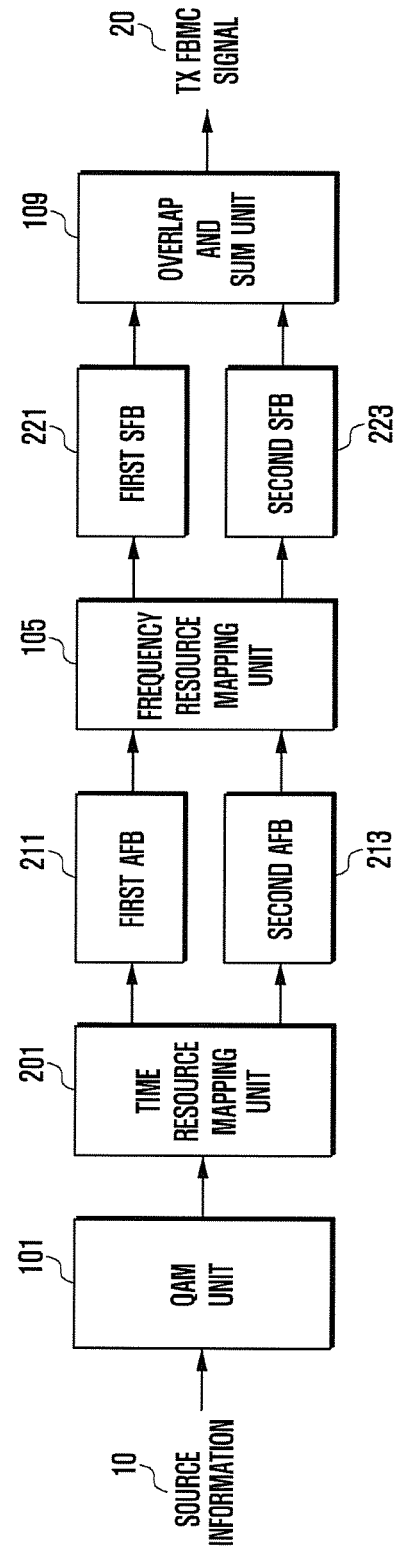

FIGS. 2A and 2B are block diagrams of transmission devices for QAM-FBMC scheme-based single carrier transmission according to the present invention.

In the following description of FIG. 2A, the source information 10 may be a coded signal as described above. Typically, the data to be transmitted or a signal to be transmitted for signaling may be coded in a predetermined coding scheme and then modulated. Accordingly, the data (or symbol) to be transmitted or the signal for coded signaling is referred to as source information 10 for convenience of explanation.

The source information 10 is input to the QAM modulation unit 101 for the transmission scheme of the FBMC system. The QAM modulation unit 101 may perform QAM on the source information. Here, the QAM modulation unit 101 may be configured and operate in the same manner as the modulator 101 of FIG. 1. In FIG. 2A, the same reference numbers are used as in FIG. 1 under the assumption that the modulation unit 101 of FIG. 1 uses a QAM scheme.

Unlike the operation described with reference to FIG. 1, in FIG. 2A the signal output from the QAM modulation unit 101 is input to the time resource mapping unit 201. This operation is carried out to allocate resources in the time domain and thereby protect against variation of self SIR on the time axis in the case that the resources are allocated closely in the frequency domain in the FBMC-based radio communication system. The time resource mapping unit 201 maps the QAM symbols to the time resources to protect against the change of the self SIR on the time axis.

There is an optimal allocation pattern for the time resource mapping unit 201 to allocate the QAM symbol in the time domain. The pattern for the time resource mapping unit 201 to allocate the QAM symbol in the time domain is described hereinafter. Typically, the length of the data (or symbol) transmitted in the FBMC-based radio communication system is expanded by as much as the value of an overlap factor. There is an optimal allocation pattern capable of lessening the PAPR or self SIR effect caused by the extended length of the data (or symbol), and this allocation pattern may be determined based on the overlap factor, i.e., the length of the total resource for allocating the symbol modulated in a QAM scheme. If the optimal allocation pattern capable of lessening the PAPR or self SIR effect is given as $L_d$, $L_d$ may become the distance between resources allocated on the time axis. Accordingly, it may be possible to allocate QAM symbols at an interval of $L_d$ and pad zeros in the positions to which no QAM symbols are allocated. As a consequence, the time resource mapping unit 201 may map the QAM symbol to the time resources according to the above rule.

The symbols mapped to the time resources by the time resource mapping unit 201 are input to the first and second AFBs 211 and 213. One of the first and second AFB 211 and 213 is selected as the best AFB based on a specific control signal. If the first AFB 211 is selected, the first AFB 211 is activated to filter the symbols mapped to the time resources by the time resource mapping unit 201. If the second AFB 213 is selected, the second AFB 213 is activated to filter the symbols mapped to the time resources by the time resource mapping unit 201. It should be noted that the first and second AFB 211 and 213 are not activated simultaneously. If the overlap factor of the first AFB 211 or the second AFB 213 is given as $L_a$, $L_a$ has to fulfil the condition of equation (2) in association with $L_d$, i.e., distance between the resources allocated on the time axis.

$$L_a \geq L_d \quad (2)$$

As described above, AFB may be present in various forms. However, in order to avoid loss in spectrum confinement, it is necessary to fulfil the condition of equation (3).

$$P_a^H P_s = I \quad (3)$$

In equation (3), $P_a^H$ and $P_a$ are Hermitian functions. One AFB may be configured only with a DFT.

As described above, the symbols mapped to the time resources are filtered by the first AFB 211 or the second AFB 213 and then input to the frequency resource mapping unit 105. The frequency resource mapping unit 105 maps the signal (or symbol) filtered by the first AFB 211 or the second AFB 213 to the frequency resources preconfigured or scheduled. The signals mapped to frequency resources by the frequency resource mapping unit 105 are input to the SFB 107. The SFB 107 synthesizes the symbols mapped to the frequency resources, i.e., split into sub-bands, to recover time domain symbols.

The time domain symbol recovered by the SFB 107 is input to the overlap & sum unit 109 for generating a signal in the format appropriate for the FBMC system. The overlap & and sum unit 109 overlaps the symbols and synthesizes (sums) the overlapped symbols according to the overlap factor configured in the FBMC system. The overlapped and summed symbol is output as the transmit FBMC signal 20.

Further description is made with reference to FIG. 2B. Unlike the embodiment of FIG. 2A in which one SFB is present, there are two SFBs, i.e. first and second SFBs 221 and 223, in the embodiment of FIG. 2B.

Before a comparison is made between FIGS. 2A and 2B, it should be noted that the filter bank-based SC-FDMA system for transmitting QAM signals has to use the AFB. In an embodiment of the present invention, it is necessary to configure two or more AFBs rather than just using one AFB. In an embodiment of the present invention, the best AFB is selected for use among two or more AFBs. In both the two embodiments of FIGS. 2A and 2B, two different AFBs 211 and 213 are used. Although FIGS. 2A and 2B are depicted as having two AFBs as embodiments to help understand the present invention, it may also be possible to use three or more AFBs in real implementation. It should be noted that a variable AFB can be used to operate as one of multiple AFBs selectable by applying one of two or more parameters.

Typically, one user does not use the whole frequency band. Accordingly, it may be possible to use only one SFB for frequency domain resource allocation as shown in FIG. 2A or a plurality of SFBs 221 and 223 as shown in FIG. 2B. As described above, two prototype filters are used as AFBs in both the embodiments of FIGS. 2A and 2B. It should be noted that two or more AFBs can be used as described above.

Descriptions are made hereinafter of the OQAM-FBMC and QAM-FBMC schemes comparatively. The OQAM-FBMC and QAM-FBMC schemes can be distinguished from each other depending on whether the number of prototype filters is 1 or equal to or greater than 2 regardless of the frequency domain resource allocation at the SFB. The OQAM scheme differs from the QAM scheme in that the OQAM scheme transmits offset QAM symbols. Accordingly, in the case of using the OQAM scheme, only one AFB can be used.

In the case of using the QAM-FBMC scheme, however, multiple AFBs are used; thus, the number of the prototype filters is equal to or greater than 2. In the case of the QAM-FBMC scheme, the SIR is maintained by the weighted sum of multiple AFBs and affects the PAPR; thus, multiple (two or more) AFBs are required regardless of whether the number of SFBs is one or two. If the AFB fulfils the condition of equation (3) in the QAM-FBMC scheme, the spectrum confinement is determined by the SFB. Accordingly, the average self SIR is determined based on the SFB in the QAM-FBMC scheme; however, in the QAM-FBMC scheme it is possible to make a local change of the self SIR by adjusting the AFB. In the case of changing the self SIR locally by adjusting the AFB, it may also be possible to adjust the PAPR.

To summarize the above description, there may be two or more AFBs fulfilling the condition of equation (1) in association with one SFB. The present invention is capable of transmitting data using one SFB and the AFB suitable for reducing PAPR among a plurality of AFBs fulfilling the condition of equation (1). A description is made hereinafter with reference to FIGS. 5A and 5B of the method for use of one SFB and the best AFB selected among multiple AFBs fulfilling the condition of equation (1) in correspondence to one SFB.

Figure 3:
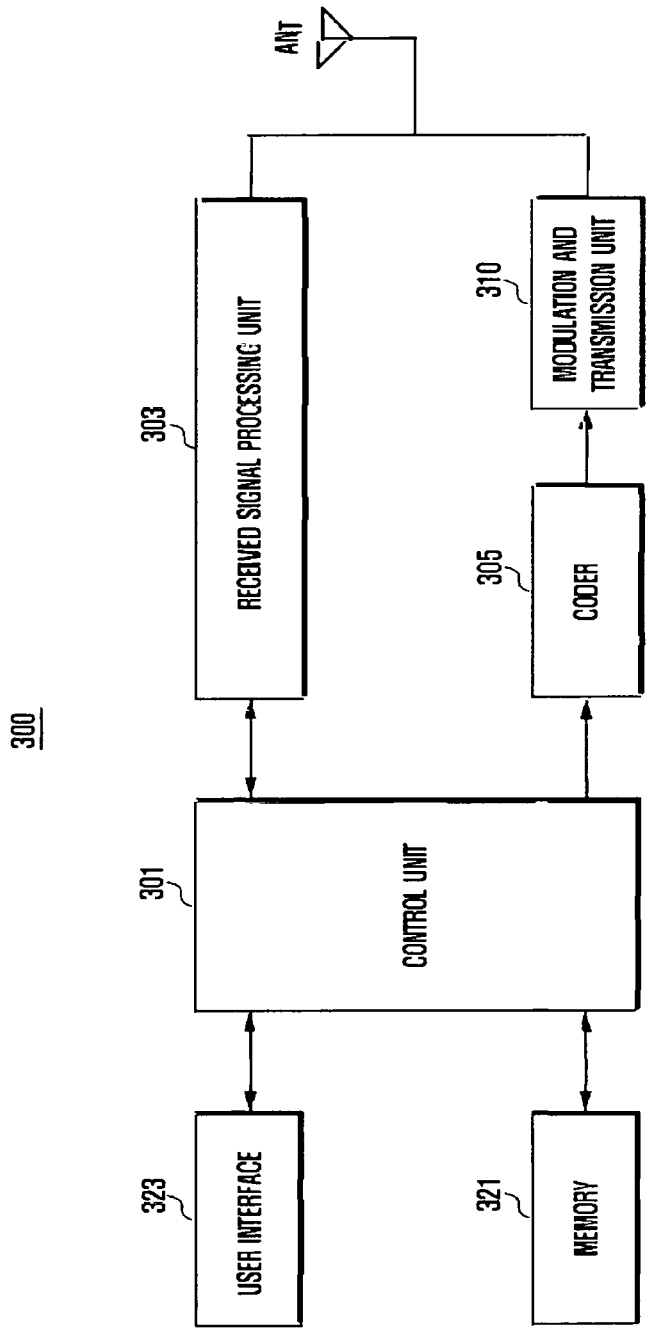
FIG. 3 is a block diagram illustrating a communication device for single carrier communication in an FBMC system according to the present invention.

FIG. 3 is a block diagram illustrating a communication device for single carrier communication in an FBMC system according to the present invention.

The communication device exemplified in FIG. 3 has a configuration of a user terminal. In reference to FIG. 3, the communication device 300 includes a control unit 301, a received signal processing unit 303, a coder 305, a modulation and transmission unit 310, an antenna (ANT), a memory 321, and a user interface 323.

The control unit 301 may include a device for controlling overall operation of the communication device 300 and executing operations in response to a user's requests such as an application processor and a communication processor taking charge of controlling data transmission and reception. Although the control unit 301 is depicted to include an application processor and a communication processor for convenience of explanation, the respective processors may be implemented in the form of separate semiconductor chips.

The received signal processing unit 303 may receive an RF signal from a base station of the FBMC system and may convert the RF signal to baseband digital data capable of being processed by the control unit 301. The received signal processing unit 303 may include a low noise amplifier, a down convertor, and a modulator/demodulator and exemplified as the received signal processing unit 303 for convenience of explanation. Part of the received signal processing unit 303 may be configured to be commonly used with part of the coder 305 and the modulation and transmission unit 310. It should be noted that the present invention exemplifies the components in the forms capable of helping understand the operations related to the invention rather than the forms applied to the real product.

The coder 305 encodes the data or signals output from the control unit 301. The present invention is not limited by the coding scheme of the coder 305. However, the coder 305 may perform encoding of the data or signals to transmit with different coding schemes if necessary. The signal output from the coder 305 may be the source information 10 as described with reference to FIGS. 1, 2A, and 2B.

The source information 10 output from the coder is input to the modulation and transmission unit 310. The modulation and transmission unit 310 generates an FBMC signal through modulation and resource mapping operations as described with reference to one of FIGS. 1, 2A, and 2B and transmits the FBMC signal through the antenna (ANT). The configuration and operation of the modulation and transmission unit 310 have been described above; thus, detailed descriptions thereof are omitted herein. However, the operation of selecting part of filter banks included in the modulation and transmission unit 310 may be performed based on the control signal output from the control unit 301. In the embodiment of FIG. 2A, one of the first and second AFBs 211 and 213 is selected according to the control signal output from the control unit 301. In the embodiment of FIG. 2B, one of the first and second AFBs 211 and 213 and one of the first and second SFBs 221 and 223 may be selected according to a control signal output from the control unit 301. The control unit 301 may also provide the mapping information output from the time resource mapping unit 201 and the frequency resource mapping unit 105.

The memory 321 may include a region for storing data necessary for a control operation of the communication device 300, a region for storing data generated during the control operation, and a region for storing data according to the user's needs. The present invention is not limited by the manufacturing type of the memory 321 (SDRAM, flash memory, hard disc, and memory) nor by the implementation type of the memory 321 (internal memory and external memory).

The user interface 323 is a module for providing an interface between the communication device 300 and the user and may include a display module and an input module. It should be noted that the present invention is not limited by the user interface 323.

Figure 4:
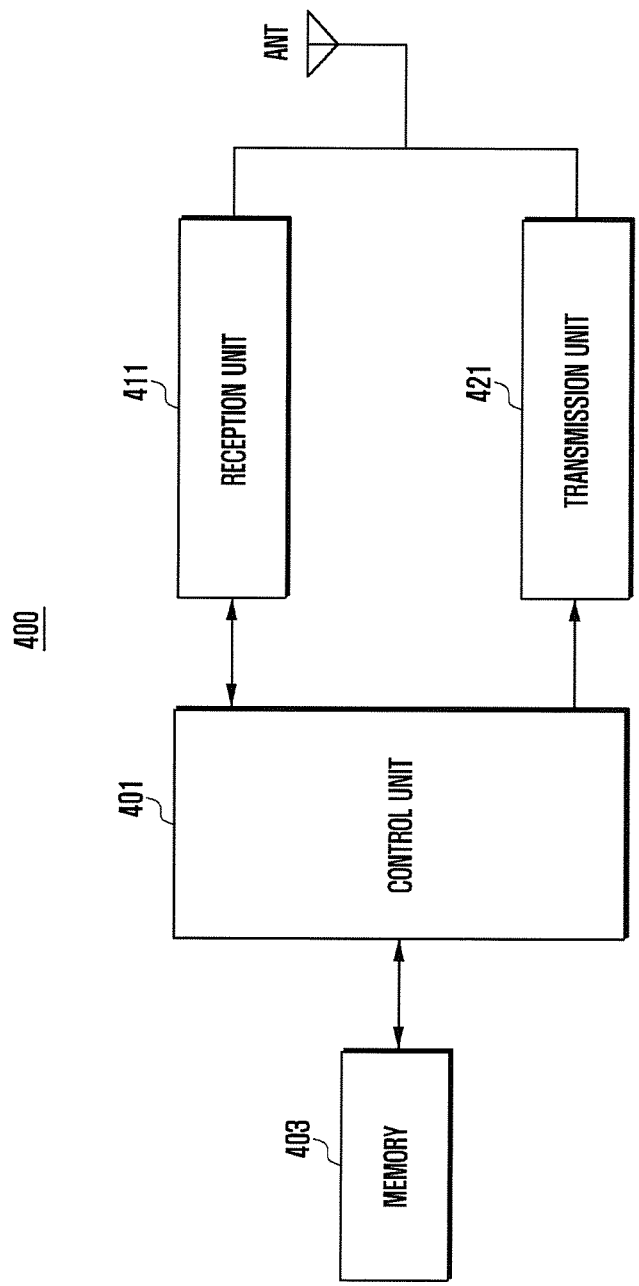
FIG. 4 is a block diagram illustrating a configuration of a base station for performing uplink single carrier communication in an FBMC system to which the present invention is applied.

FIG. 4 is a block diagram illustrating a configuration of a base station for performing uplink single carrier communication in an FBMC system to which the present invention is applied.

In reference to FIG. 4, the base station 400 includes a control unit 401, a reception unit 411, a transmission unit 421, and a memory 403. The base station 400 may also include an antenna (ANT) for radio communication with communication devices.

The reception unit 411 performs down-converting and demodulation/decoding on the RF band signal received from a communication device through the antenna (ANT) to output a baseband digital signal. The reception unit 411 may receive and process a single carrier signal transmitted from a communication device, i.e. terminal, to the base station 400, i.e. transmitted in downlink, in the FBMC system.

The transmission unit 421 may receive data or signals from the control unit 401, convert the data or signals into a format for the FBMC-based radio communication system, and transmit the signal through the antenna (ANT). The communication devices may receive the downlink data transmitted in this way by the base station 400.

The control unit 401 controls overall operations of the base station and schedules the communication devices. That is, the control unit 401 may include a scheduler. The control unit 401 may provide the communication device with the filter configuration and resource allocation information. The control unit 401 may also perform data transmission/reception to/from the network of the radio communication system and terminal authentication process. Detailed descriptions of such well-known operations are omitted herein to avoid obscuring the subject matter of the present invention. The operation of the control unit 401 is described in more detail with reference to the accompanying drawings.

The memory 403 includes a region for storing data necessary for controlling the base station 400, a region for storing temporarily data generated during the control operation, and a region for storing data transmitted to and received from communication devices. The present invention is not limited by any of the manufacturing type nor the implementation type of the memory 403 as described in association with the communication device of FIG. 3, and the memory 403 may further include other regions for storing other types of data.

A description is made hereinafter of the uplink single carrier communication through a resource allocation procedure between the communication device 300 and the base station 400 according to the present invention.

Figure 5A:
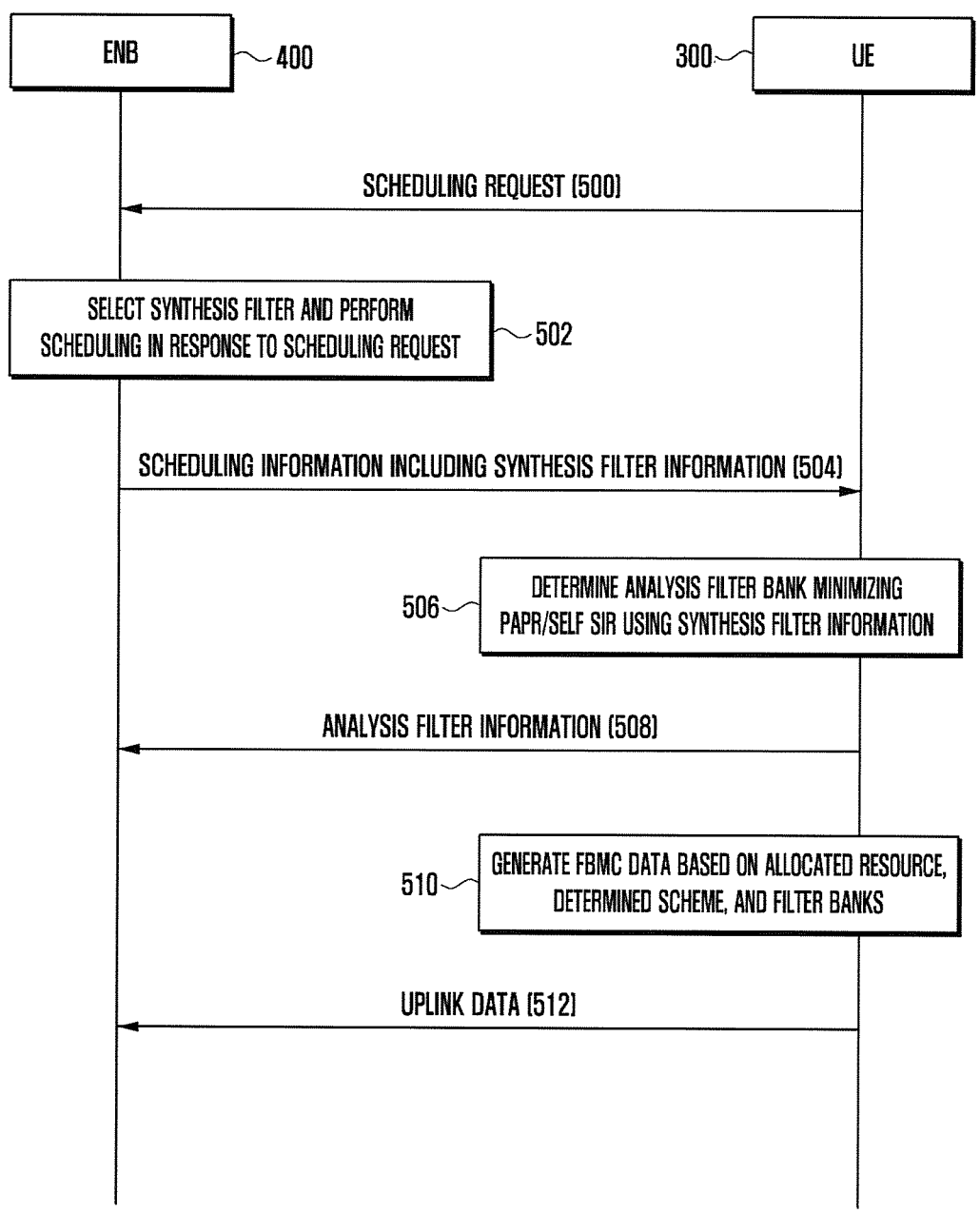
FIG. 5A is a signal flow diagram illustrating a procedure for configuring an AFB to transmit data in a case where an SFB is determined by a base station according to an embodiment of the present invention.

FIG. 5A is a signal flow diagram illustrating a procedure for configuring an AFB to transmit data in a case where an SFB is determined by a base station according to an embodiment of the present invention.

In FIG. 5A, a User Equipment (UE) 300 may be the communication device exemplified in FIG. 3, and an Enhanced Node B (eNB) 400 may be the base station exemplified in FIG. 4. The UE 300 may be configured as shown in FIG. 1, FIG. 2A, or FIG. 2B. In the following description, it is assumed that the modulation and transmission unit 310 of the UE 300 is configured as shown in FIG. 2A or 2B.

If it has uplink data to transmit, the UE 300 may transmit a scheduling request message to the eNB 400 at step 500. The scheduling request message may include the information on the SFB for use in the UE 300. For example, the eNB 400 may store the SFB for the UE 300 in its memory 403. If the eNB 400 has the information on the SFB for the UE 300, this may be the case where the UE 300 has provided the eNB 400 with the corresponding information in advance. Examples of such a case include a case where the UE 300 powers on and transmits an attach request to the eNB 400, or moves from one eNB coverage area to another to provide UE information on the UE 300 or a case where a high level node of a network that manages UE information provides the information on the UE 300. In the following description, it is assumed that the UE 300 provides the SFB information in response to the scheduling request signal transmitted at step 500.

Then the eNB 400 receives the scheduling request message at step 500 and performs scheduling on the corresponding UE at step 502. At step 502, the eNB 400 may determine a number of Resource Blocks (RBs) as the frequency domain resources, configure a resource allocation mode, e.g. localized mode or distributed mode, and determine specific SFB indication information, e.g. SFB index indicating a specific SFB among the SFBs available for the UE. The resource allocation method and resource allocation parameters are described later in more detail with reference to FIG. 8.

At step 504, the eNB 400 transmits to the UE 300 the scheduling information, i.e. resource allocation information including the SFB index, generated as a scheduling result. At this time, the eNB 400 may perform resource allocation in consideration of the frequency resources allocated to the neighboring users. That is, the eNB 400 may determine the requirements for spectrum confinement for the UE that has requested for scheduling.

Then the UE 300 may determine uplink transmission resources and AFB at step 506 on the basis of the scheduling information received at step 504. Here, the scheduling information may include resource allocation information. As described above, there may be two or more AFBs when one SFB is determined. Accordingly, the UE 300 determines the best AFB that minimizes PAPR and self SIR among the multiple AFBs fulfilling equation (1) in association with the SFB determined by the eNB at step 506.

At step 508, the UE 300 transmits to the eNB 400 the information on the AFB selected at step 506. The eNB 400 is aware of the AFB in use by the UE 300 based on the AFB information.

At step 510, the UE 300 generates FBMC data to be transmitted on the resources indicated by the scheduling information transmitted to the UE 300 at step 504. At this time, the UE 300 may generate the FBMC data to be transmitted by means of the AFB determined at step 506. Next, the UE 300 may transmit to the eNB 400 the FBMC data using the allocated uplink resources at step 512.

FIG. 5A is a control flowchart for selecting one of SFBs available for a UE and notifying the UE of the selected SFB. A description is made hereinafter of the method by which an eNB notifies a UE of SFB group information with reference to FIG. 5B.

Figure 5B:
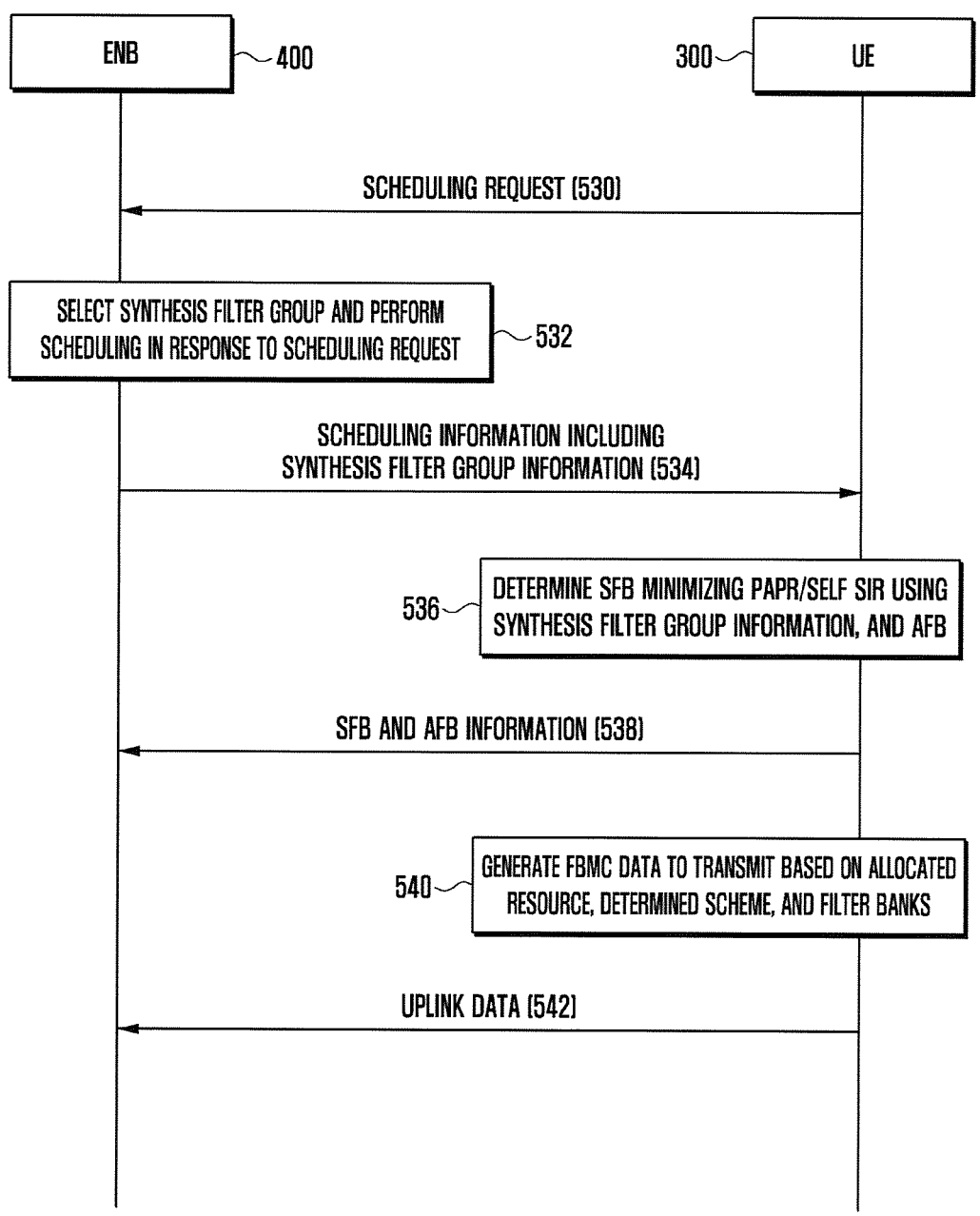
FIG. 5B is a signal flow diagram illustrating a procedure for a UE to configure an SFB and an AFB to transmit data in a case where the SFB group is determined by an eNB according to an embodiment of the present invention.

FIG. 5B is a signal flow diagram illustrating a procedure for a UE to configure an SFB and an AFB to transmit data in a case where the SFB group is determined by an eNB according to an embodiment of the present invention.

In FIG. 5B, the User Equipment (UE) 300 may be the communication device exemplified in FIG. 3, and the enhanced Node B (eNB) 400 may be the base station exemplified in FIG. 4. The UE 300 may be configured as shown in FIG. 1, FIG. 2A, or FIG. 2B. In the following description, it is assumed that the modulation and transmission unit 310 of the UE 300 is configured as shown in FIG. 2A or 2B.

If it has uplink data to transmit, the UE 300 may transmit a scheduling request message to the eNB 400 at step 530. The scheduling request message may include the information on the SFB for use in the UE 300. For example, the eNB 400 may store the SFB for the UE 300 in its memory 403. If the eNB 400 has the information on the SFB for the UE 300, this may be the same case as described with reference to FIG. 5A. The eNB 400 receives the scheduling request message transmitted at step 530 and schedules the corresponding UE at step 532.

The scheduling operation of eNB 400 at step 532 may be formed in such a way of determining a number of Resource Blocks (RBs), configuring a resource allocation mode, e.g. localized mode or distributed mode, and determining specific SFB indication information, e.g. SFB index indicating a specific SFB among the SFBs available for the UE 300, as described above. The resource allocation method and resource allocation parameters are described later in more detail with reference to FIG. 8.

Even at this time, the eNB 400 may determine the requirements for spectrum confinement for the UE that has requested for scheduling in consideration of the frequency resources allocated to other users. That is, the eNB 400 may transmit to the UE an SFB group index for restricting a spectrum confinement condition and SIR condition. Transmitting an SFB group index may be an operation to provide the UE with the information on a group of SFBs for restricting the spectrum confinement condition and SIR condition.

The eNB 400 generates scheduling information by scheduling the UE at step 532 and transits to the UE 300 the resource allocation information including the scheduling information, i.e., SFB group index, at step 534.

At step 536, the UE 300 determines the uplink transmission resources and AFB based on the scheduling information received at step 534. At this time, the UE 300 may select one of the SFBs included in the SFB group indicated by the SFB group information from the eNB. If one SFB is selected, the UE 300 may determine the best analysis filter having the smallest PAPR and smallest self SIR and fulfilling the condition of equation (1) in correspondence to the determined SFB. At this time, the UE 300 may generate the analysis filters with the smallest PAPR and the smallest self SIR for the respective SFBs included in the SFB group. Among the pairs, the best pair can be selected as the filter bank pair for data transmission.

Then the UE 300 transmits to the eNB 400 the determined SFB index and AFB index at step 538. At step 538, the UE 300 may further transmit the overlapping factor information of the AFB. By transmitting the SFB and AFB information from the UE 300 to the eNB 400, the eNB 400 becomes aware of the SFB and AFB in use by the UE 300.

At step 540, the UE 300 generates FBMC data to be transmitted on the resources allocated to the UE 300 at step 534. At this time, the UE generates the FBMC data using the SFB and AFB determined at step 536. At step 542, the UE 300 may transmit to the eNB 400 the FBMC data using the uplink resources allocated at step 534.

The operations described with reference to FIGS. 5A and 5B may be performed once for the UE to transmit data or more times for the case where an SFB and corresponding AFB need to be changed during the data transmission. That is, if it is necessary to change a filter bank during the communication with the selected SFB and the correspondingly best AFB selected among the AFBs fulfilling the condition of equation (1), an SFB and AFB reselection operation may be performed.

In the case of receiving the SFB group index from the eNB as described with reference to FIG. 5B, the UE may select another SFB included in the SFB group indicated by the SFB group index received from the eNB 400 at step 532 and the best AFB corresponding thereto among the AFBs fulfilling the condition of equation (1). If the SFB is changed in this way, the UE may further perform steps 536 to 542.

Figure 6:
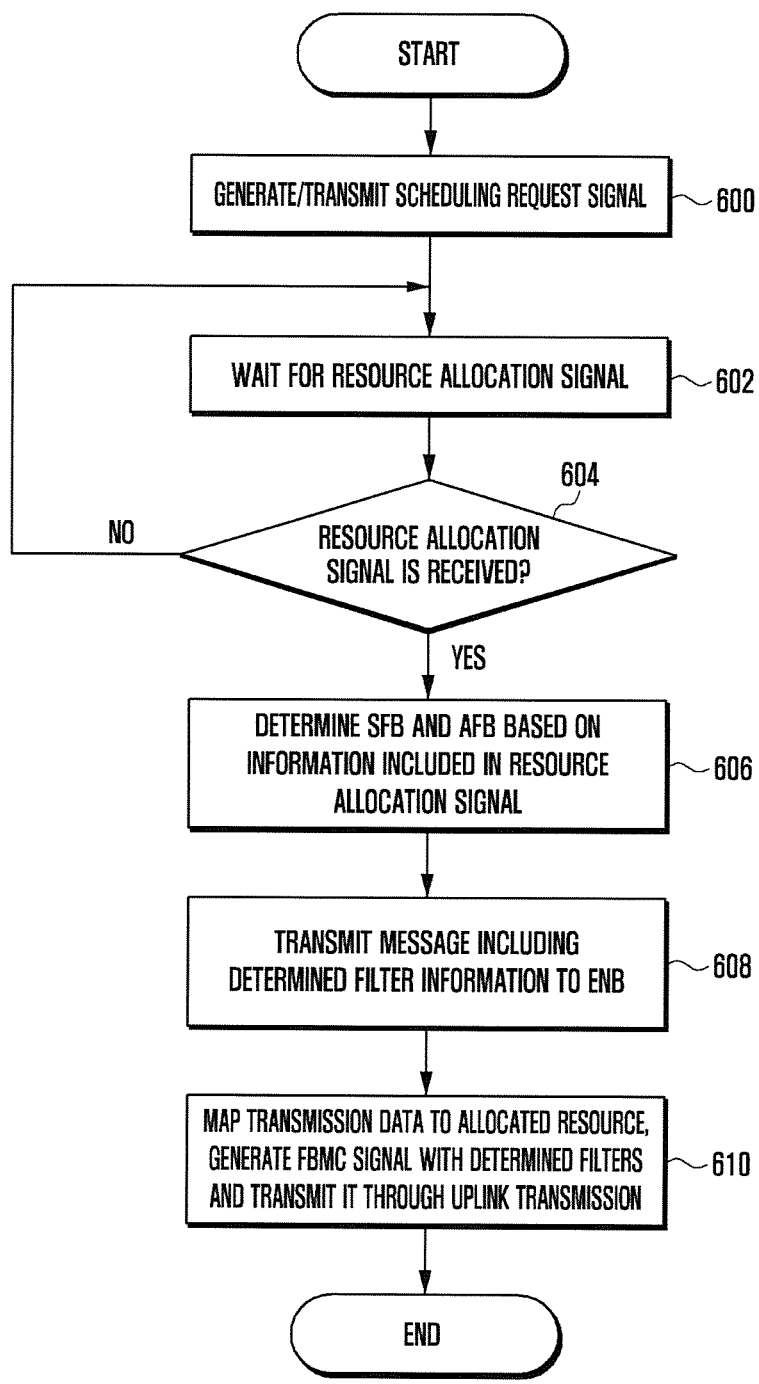
FIG. 6 is a flowchart illustrating a communication procedure of a communication device using allocated resources according to the present invention.

FIG. 6 is a flowchart illustrating a communication procedure of a communication device using allocated resources according to the present invention.

In reference to FIG. 6, the control unit 301 of the communication device 300 controls the coder 305 and the modulation and transmission unit 310 to generate and transmit a scheduling request signal in uplink at step 600. Then the control unit 301 waits for receipt of a resource allocation signal from the eNB 400 at step 602.

The control unit 301 determines at step 604 whether a resource allocation signal is received by means of the received signal processing unit 303. The resource allocation signal may include resource allocation information for uplink data transmission of the communication device and SFB information or SFB group information, the resource allocation signal being transmitted by the eNB 400 as described with reference to FIGS. 5A and 5B.

If it is determined at step 604 that the resource allocation signal is received, the procedure goes to step 606; if it is determined that no resource allocation signal is received, the procedure returns to step 602.

If the resource allocation signal is received, the control unit 301 may acquire the information on the resources allocated by the eNB 400 from the frequency domain resource allocation information included in the resource allocation signal and the information on the resource allocation scheme based on the resource allocation parameters.

The resource allocation method is described later in more detail with reference to FIG. 8.

The control unit 301 may select an AFB based on the SFB information received from the eNB 400. If the eNB 400 provides the information on one SFB, the control unit 301 may select an AFB corresponding to the SFB selected by the eNB 400 and having the smallest PAPR and self SIR. That is, the control unit 301 may select the AFB having the smallest PAPR and self SIR among the AFBs fulfilling the condition of equation (1) in association with the SFB selected by the eNB 400.

In the case that the eNB 400 provides SFB group information, the control unit 301 may determine AFBs having the least PAPR and self SIR in association with respective SFBs belonging to the SFB group and select the best SFB and AFB. If the control unit 301 may support only one SFB belonging to the SFB group, it may determine the AFB in the same way as the case of receiving the information on one SFB. At this time, the SFB and the AFB corresponding to the SFB have to fulfil the condition of the aforementioned equation as described above. By arranging the AFB before the SFB, it is possible to transmit data over a single carrier and suppress the rise of the PAPR caused by overlap transmission.

If the resource allocation and SFB and AFB selection are completed, the control unit 301 generates and transmits a message including the information on the selected filter at step 608. The message transmitted at step 608 may be configured differently depending on the resource allocation information provided by the eNB 400. If the eNB 400 provides the communication device 300 with the information on one SFB, the control unit 301 may transmit to the eNB 400 the information on an AFB. Otherwise, if the eNB 400 provides the communication device 300 with the information on an SFB group, the control unit 301 may transmit to the eNB 400 the information on an SFB and AFB.

According to an embodiment, it may be possible to omit step 608. In the case that the eNB 400 has the information on the SFBs and AFBs available for use at the communication device 300, if the eNB 400 provides the SFB information, the communication device 300 may omit step 608 when it already has the information on the AFB to be selected.

Next, at step 610 the control unit 301 generates data to transmit using the selected SFB and AFB and transmits the generated data using the resources allocated by the eNB.

Although not shown in FIG. 6, it may be possible for the SFB to change before completion of the data transmission as described with reference to FIG. 5B. That is, it may occur that the synthesis filter is changed in response to a predetermined request or according to a necessity during the data transmission with one of the SFBs included in the SFB group indicated in the information from the eNB 400 and the best AFB selected in association with the SFB.

In this case, it may be possible to select one of the SFBs (with the exception of the SFB in use for the ongoing data transmission) included in the SFB group informed by the eNB during the operation of step 610. In this way, it may be possible to select a new AFB fulfilling the above-described condition. If the new SFB and AFB are selected in this way, the control unit 301 may transmit a message including the corresponding information to provide the eNB with the information on the new SFB and AFB for use in data transmission as at step 608. Afterward, the control unit 301 may transmit uplink data using the newly selected SFB and AFB as at step 610.

Figure 7:
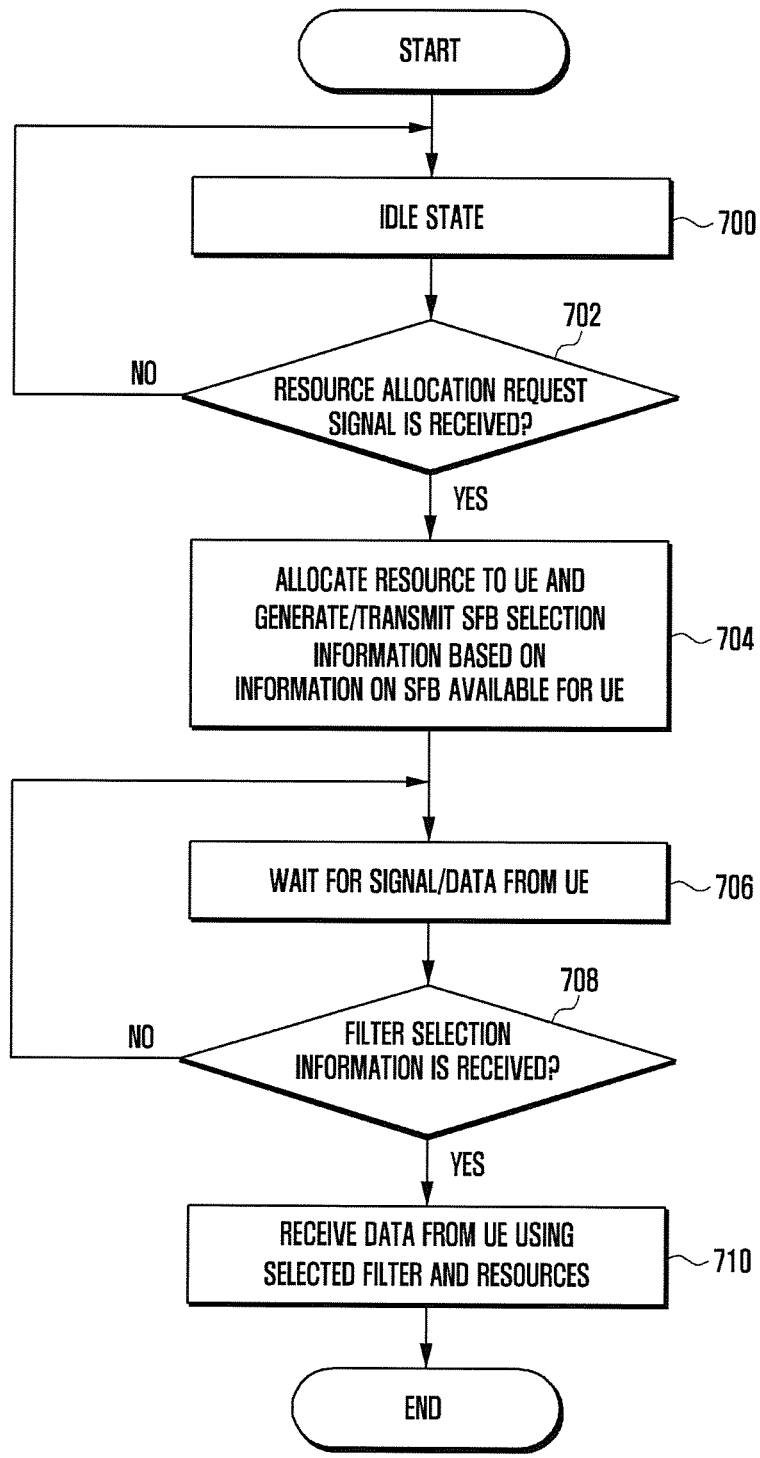
FIG. 7 is a flowchart illustrating a procedure for an eNB to allocate resources to a UE and receive data using the allocated resources according to the present invention.

FIG. 7 is a flowchart illustrating a procedure for an eNB to allocate resources to a UE and receive data using the allocated resources according to the present invention.

In reference to FIG. 7, the control unit 401 stays in the idle state at step 700. In the idle state, the eNB waits for receiving uplink signals from the communication devices located within the coverage area of the eNB 400 or data to be transmitted to a certain communication device located within the coverage area of the eNB 400. In this state, the control unit 401 may determine whether a resource allocation request signal is received from a communication device at step 702. If it is determined at step 702 that a resource allocation request signal is received from a communication device, the procedure goes to step 704; if it is determined that no resource allocation signal is received, the procedure returns to step 700.

At step 704, the control unit 401 allocates resources to the corresponding UE and determines resource allocation parameters. The resource allocation parameters are configured to determine a resource allocation scheme, and a description thereof is made later in detail with reference to FIG. 8. The control unit 401 reads out the information on the SFBs available for the UE from the memory 403 and selects the SFB for use at the UE at step 704. At this time, the control unit 401 may select an SFB or a predetermined SFB group. If the selection is completed, the control unit 401 generates and transmits to the UE a signal including the resource allocation information, resource allocation parameters, and SFB information.

Here, the control unit 401 may determine the requirements for spectrum confinement for the UE requested for scheduling in consideration of the frequency resources allocated to neighboring users during the resource allocation to the UE. It may be possible to notify the UE of a specific SFB as described with reference to FIG. 5A or a synthesis filter group index restricting a specific spectrum confinement condition and SIR condition as described with reference to FIG. 5B.

As a consequence, the UE may select an AFB in association with the specific SFB or an AFB in association with one of the SFBs belonging to an SFB group. If the SFB is changed according to the situation, the UE has to change the AFB too. If the AFB is changed, the UE may select a new AFB in consideration of the self SIR and PAPR as described above.

Afterward, the control unit 401 waits for receipt of a signal or data from the UE at step 706. Next, the control unit 401 determines at step 708 whether filter selection information is received. If it is determined at step 708 that the filter selection information is received, the procedure goes to step 710; if it is determined that no filter selection information is received, the procedure returns to step 706. As described with reference to FIG. 6, in the case that the UE does not transmit any filter selection information to the eNB, it may be possible for the eNB to determine at step 708 whether any uplink data is received.

In the following description, it is assumed that specific filter selection information is received. At step 710, the control unit 401 may check the filter selection information received from the UE and receive FBMC data from the UE using the allocated resource based on the information.

Figure 8:
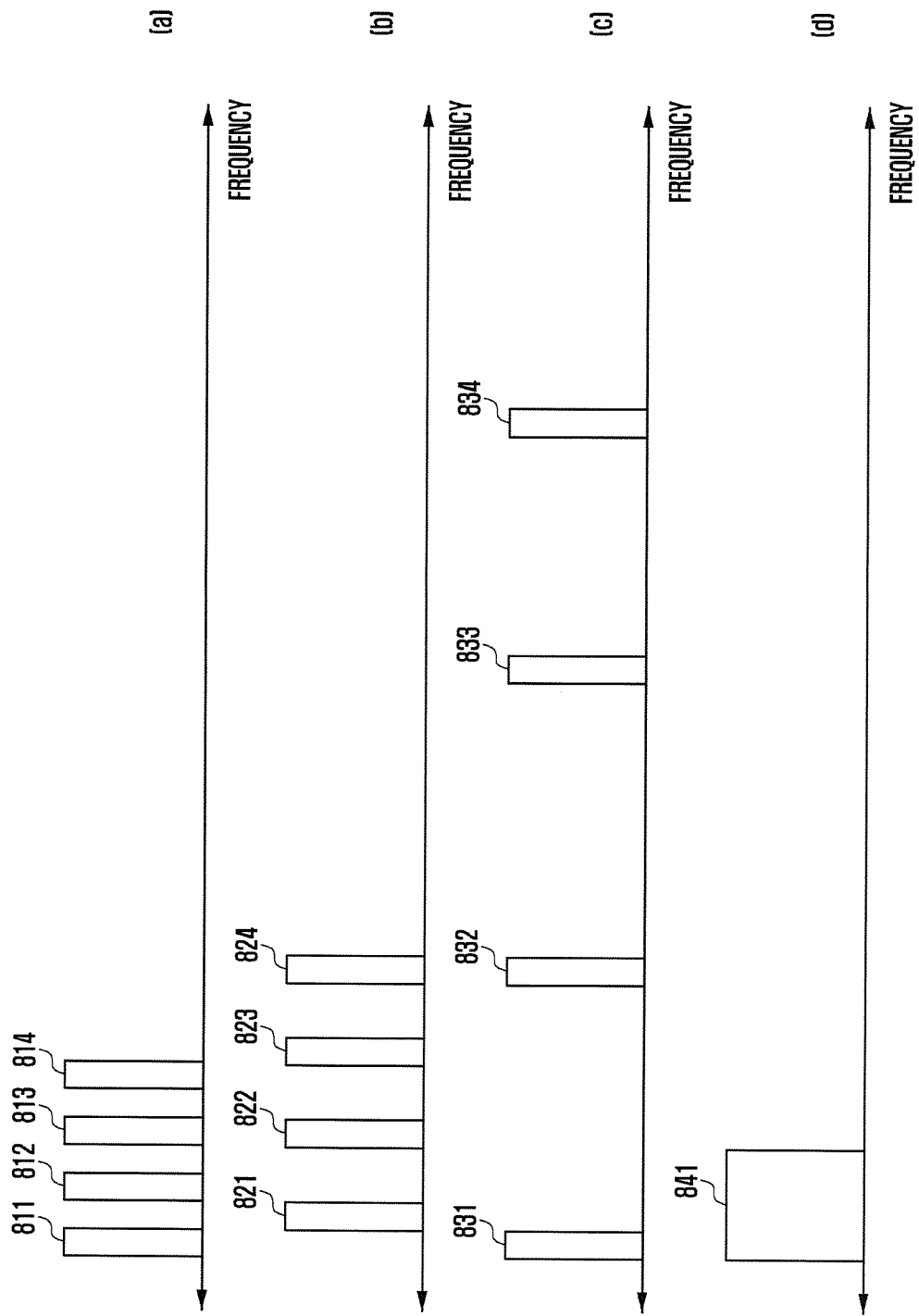
FIG. 8 is a conceptual diagram illustrating a method for an eNB to allocate frequency domain resource to a UE according to the present invention.

FIG. 8 is a conceptual diagram illustrating a method for an eNB to allocate frequency domain resource to a UE according to the present invention.

FIG. 8 exemplifies a method for allocating 4 RBs to a UE in the frequency domain. Parts (a), (b), and (d) are directed to the localized mode. Part (c) is directed to the distributed mode.

In reference to part (a) of FIG. 8, the frequency resources 811, 812, 813, and 814 arranged at an interval are allocated in the frequency domain. The interval may be a short distance on the frequency axis. That is, the frequency resources may be allocated such that all allocated frequency resources are consecutive or spaced at a predetermined interval as shown in part (d) of FIG. 8.

Part (c) of FIG. 8 exemplifies the distributed mode. That is, the frequency resources are allocated at a very wide interval across the whole frequency band.

The information on the interval between frequencies in the localized or distributed mode may be used as a resource allocation parameter. If the resource allocation parameter is given as $r_d$, $r_d$ is set to 1 for the localized mode in which the frequency resources are allocated as shown in part (d) of FIG. 8. The resource allocation parameter $r_d$ may also be set to 2 for part (a) of FIG. 8 or 3 for part (b) of FIG. 8. Like this, the localized mode is characterized in that the frequency resources are allocated in a localized manner on the frequency axis.

A description is made of the distributed mode in comparison with the localized mode. Assuming the whole frequency of M and the allocated frequency resource of K, the resource allocation parameter $r_d$ has a relationship as in equation (4) in the distributed mode.

$$r_d = \frac{M}{K} \quad (4)$$

That is, the distributed mode is characterized in that the frequency resources are allocated in a distributed manner across the whole frequency resource.

Meanwhile, the eNB 400 may transmit the resource allocation parameter to the UE to indicate one of the resource allocation schemes as shown in FIG. 8. However, since it is possible to analogize the best time domain parameter in consideration of the resource amount allocated to the UE and the frequency domain resource allocation, the eNB 400 may not generate any extra time domain resource allocation parameter to the UE. Particularly when the overlapping factor of AFB is fixed to the time domain resource allocation parameter, the eNB 400 may allocate time domain resources to the UE without providing extra information to the UE. If it is necessary for the eNB 400 to allocate specific time domain resource to the UE 300 or if the system is configured to inform each UE of the time domain resource allocation scheme, the eNB 400 may be configured to generate the time domain resource allocation parameter to the UE.

If the eNB 400 provides the UE 300 with resource allocation information and receives the information recommended by the UE, e.g. both the SFB information and AFB information or only the AFB information, it is possible for the eNB 400 to recover the data received from the UE 300.

As described above, the adaptive AFB selection method is capable of being used in both the OQAM-based FBMC system and QAM-based FBMC system.

Also, the localized mode, as one of the above-described frequency domain resource allocation schemes, may be considered as a method for achieving multi-user diversity gain through multi-user frequency domain resource allocation.

Figure 9:
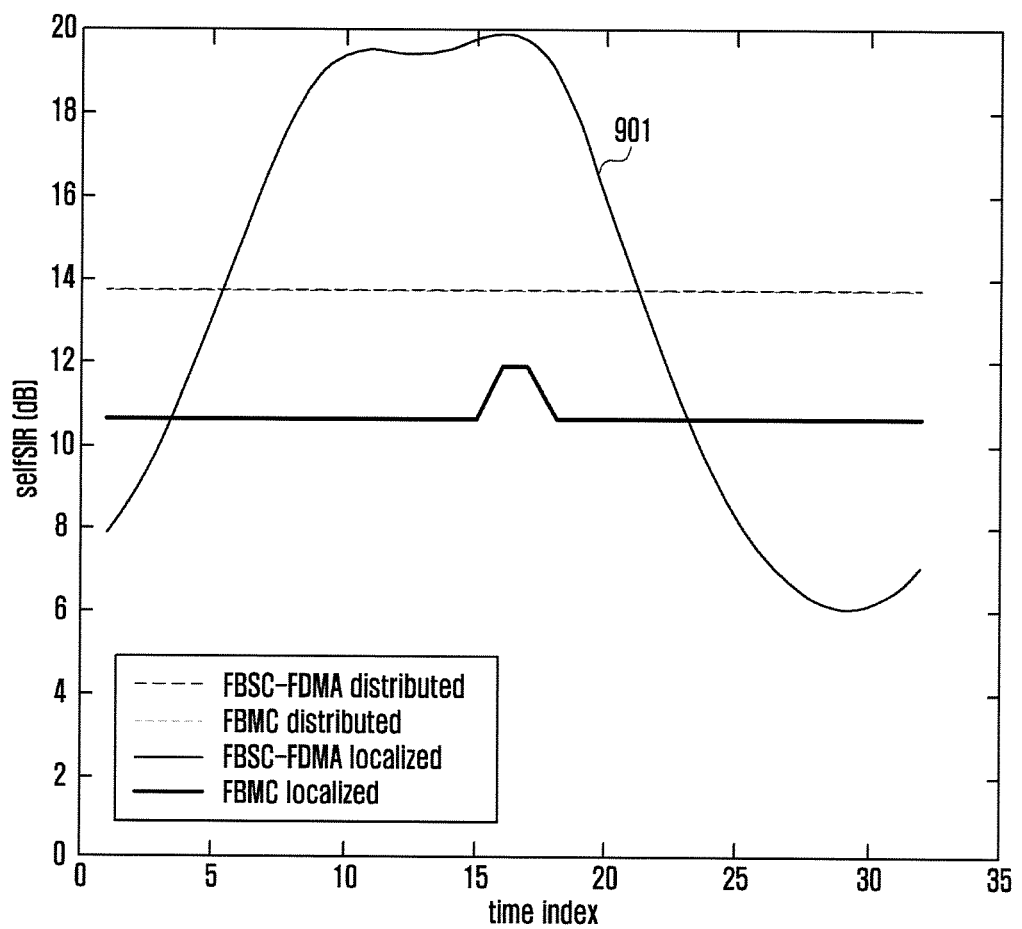
FIG. 9 is a graph illustrating a simulation result showing change of self SIR on the time axis in a localized mode of the QAM and OQAM mode FBMC systems according to the present invention.

FIG. 9 is a graph illustrating a simulation result showing change of self SIR on the time axis in a localized mode of the QAM and OQAM mode FBMC systems according to the present invention.

FIG. 9 shows that the self SIR changes significantly on the time axis in the localized mode of the QAM and OQAM mode FBMC system as denoted by reference number 901. It may be possible to categorize one user into two or more groups in the time domain in use of the AFB selected in consideration of the change of self SIR and allocate different Modulation and Coding Schemes (MCSs) in a group-specific manner.

Figure 10:
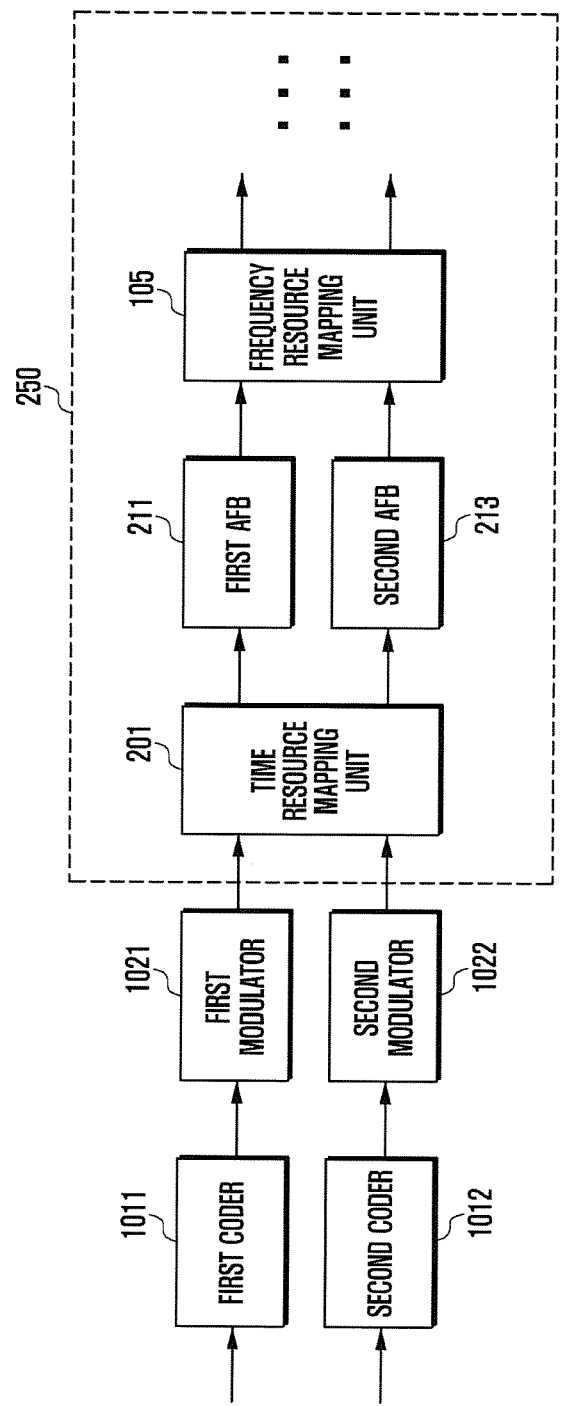
FIG. 10 is a block diagram illustrating a transmission device for applying different MCSs on the time axis for one user in a localized mode of a QAM-FBMC system according to the present invention.

FIG. 10 is a block diagram illustrating a transmission device for applying different MCSs on the time axis for one user in a localized mode of a QAM-FBMC system according to the present invention.

It should be noted that the time resource mapping unit 201, the first AFB 211, and the AFB 212 of FIG. 2 are integrally denoted by reference number 250 in the embodiment of FIG. 10.

In the case of a configuration as shown in FIG. 10, it is possible to perform encoding at two different coding rates or in two different coding schemes with the first and second coders 1011 and 1012. In the following description, it is assumed that the encoding is performed at two different coding rates. In the case of using two coders 1011 and 1012, two modulators 1021 and 1022 may be included. The first modulator 1021 is enabled for modulation operations when the first coder 1011 is activated for encoding, and the second modulator 1022 is enabled for modulation operations when the second coder 1012 is activated for encoding. The time resource mapping unit 201 of the component 250 may receive data from one of the first and second modulators 1021 and 1022 and map the data to the corresponding time resource.

As described above, there can be various types of AFBs that match with one SFB. In the case of changing the AFB, the self SIR is changed on the time axis.

Figure 11:
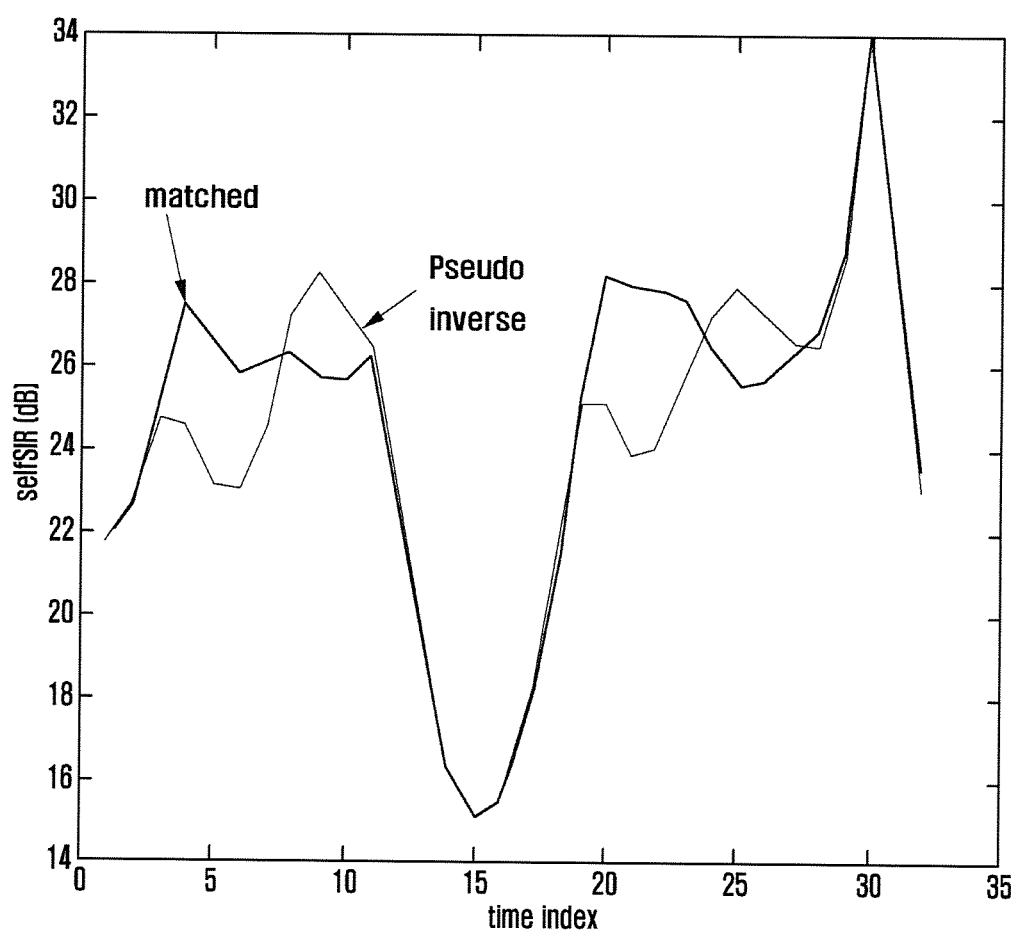
FIG. 11 is a graph illustrating a simulation result showing change of self SIR on the time axis in accordance with the change of AFB.

FIG. 11 is a graph illustrating a simulation result showing change of self SIR on the time axis in accordance with the change of AFB.

By utilizing the characteristic as shown in FIG. 11, it is possible to achieve diversity gain through an environment as if the channel has been changed for a new one because of the change of the AFB. As described above, if the eNB 400 and the UE 300 share the information on a set of AFBs in association with a given SFB and the information on the pattern for changing an AFB in the AFB set, it is possible to change the AFB and achieve diversity gain through the AFB change. The AFB change pattern may be exchanged between the eNB 400 and the UE 300, transmitted from the UE 300 to the eNB 400, or preconfigured per UE. In order to achieve the diversity gain in this way, it is necessary to transmit a coding block as split into multiple types of AFBs.

Although various embodiments of the present invention have been described using specific terms, the specification and drawings are to be regarded in an illustrative rather than a restrictive sense in order to help understand the present invention. Thus the scope of the invention should not be construed as being limited to the exemplary embodiments, and it should be recognized as contemplating various changes and modifications within the spirit and scope of the invention.

INDUSTRIAL APPLICABILITY

The present invention can be used for transmitting and receiving data in a radio communication system.

The invention claimed is:

1. A transmission device operating in a filter bank mode multiple access radio communication, the transmission device comprising:
   a plurality of analysis filter banks, each analysis filter bank configured to perform a respective reverse operation of a corresponding synthesis filter bank that is selected for transmitting modulation symbols mapped to time resources; and
   at least one processor configured to:
      modulate data into the modulation symbols;
      map the modulation symbols to the time resources on a time axis at a predetermined interval according to an overlapping factor and a number of the modulation symbols to transmit;
      map the modulation symbols filtered by a selected one of the plurality of the analysis filter banks to pre-allocated frequency resources, wherein the selected one of the analysis filter banks minimizes a self signal to interference ratio (SIR) and a peak to average power ratio (PAPR) among the plurality of analysis filter banks;
      select at least one synthesis filter bank of the plurality of the synthesis filter banks, the selected at least one synthesis filter bank configured to synthesize the modulation symbols mapped to the frequency resources to recover a time domain signal; and
      overlap and sum outputs of the selected at least one synthesis filter bank with the overlapping factor.

2. The transmission device of claim 1, wherein the selected at least one synthesis filter bank of the plurality of the synthesis filter banks is configured to perform an inverse discrete fourier transform (IDFT) operation, and the analysis filter banks perform a discrete fourier transform (DFT) operation.

3. The transmission device of claim 1, wherein the at least one processor is further configured to perform one of quadrature amplitude modulation (QAM) and offset QAM (OQAM).

4. The transmission device of claim 1, wherein the at least one processor is further configured to pad zeros in positions to which no modulation symbol is mapped.

5. The transmission device of claim 1, wherein the selected at least one synthesis filter bank of the plurality of the synthesis filter banks includes two or more synthesis filter banks, and the analysis filter banks perform respective reverse operations of corresponding synthesis filter banks.

6. A method for operating a transmission device in a filter bank mode multiple access radio communication system, the method comprising:
   modulating data to transmit into modulation symbols;
   mapping the modulation symbols to time resources on a time axis at a predetermined interval according to an overlapping factor and a number of the modulation symbols to transmit;
   selecting one analysis filter bank that minimizes a self signal to interference ratio (SIR) and a peak to average power ratio (PAPR) among a plurality of analysis filter banks, each analysis filter bank configured to perform a respective reverse operation of a corresponding synthesis filter bank that is selected to synthesize the modulation symbols mapped to the time resources;

performing, by using the selected one analysis bank, a reverse operation of the synthesis filter bank that is selected to synthesize the modulation symbols mapped to the time resources;

mapping the modulation symbols that are filtered by the selected one analysis filter bank to pre-allocated frequency resources;

synthesizing, using the selected synthesis filter bank, the filtered symbols mapped to the frequency resources to recover a time domain signal;

overlapping outputs of the selected synthesis filter bank with the overlapping factor; and summing the overlapped outputs of the selected synthesis filter bank for transmission.

7. The method of claim 6, wherein the selected synthesis filter bank performs an inverse discrete fourier transform (IDFT) operation, and the analysis filter banks perform a discrete fourier transform (DFT) operation.

8. The method of claim 6, wherein the data are modulated in one of quadrature amplitude modulation (QAM) and offset QAM (OQAM) schemes.

9. The method of claim 6, further comprising padding zeros in positions to which no modulation symbol is mapped.

10. The method of claim 6, further comprising performing, when two or more synthesis filter banks exist, reverse operations of synthesis filter banks at the analysis filter banks corresponding to the respective synthesis filter banks.

11. A method for operating a transmission device of a filter bank mode multiple access radio communication system, the method comprising:

receiving scheduling information for transmitting data in response to a scheduling request transmitted to a base station;

acquiring information on a selection on one of synthesis filter banks and allocated resources based on the scheduling information;

selecting one analysis filter bank that minimizes a self signal to interference ratio (SIR) and a peak to average power ratio (PAPR) among a plurality of analysis filter banks that perform reverse operations of correspondingly selected synthesis filter banks;

mapping modulation symbols to time resources on a time axis at a predetermined interval according to an overlapping factor and a number of the modulation symbols;

performing a reverse operation of the selected synthesis filter bank on the modulation symbols mapped to the time resources using the selected analysis filter bank;

mapping outputs of the selected analysis filter bank to predetermined frequency resources;

recovering, at the selected synthesis filter bank, time domain signals by synthesizing symbols mapped to the frequency resources; and overlapping and summing outputs of the selected synthesis filter bank with the overlapping factor for transmission.

12. The method of claim 11, wherein the selected synthesis filter banks perform an inverse discrete fourier transform (IDFT) operation, and the analysis filter banks perform a discrete fourier transform (DFT) operation.

13. The method of claim 11, wherein the data are modulated in one of quadrature amplitude modulation (QAM) and offset QAM (OQAM) schemes.

14. The method of claim 11, further comprising padding zeros in positions to which no modulation symbol is mapped.

15. The method of claim 11, further comprising performing, when two or more synthesis filter banks exist, reverse operations of synthesis filter banks at the analysis filter banks corresponding to the respective synthesis filter banks.

16. The method of claim 11, further comprising:

selecting, when information on a synthesis filter bank or a synthesis filter bank group is received, the one analysis filter bank that minimizes the self signal to interference ratio (SIR) and the peak to average power ratio (PAPR) among the plurality of analysis filter banks per synthesis filter bank.

17. A device for transmitting data in a filter bank mode multiple access radio communication system, wherein the device comprises:

a plurality of analysis filter banks, each analysis filter bank configured to perform a respective reverse operation of a corresponding synthesis filter bank that is selected for transmitting modulation symbols mapped to time resources;

at least one processor configured to:

encode the data to be transmitted at a controlled coding rate;

modulate the encoded data into modulation symbols; and select, among the plurality of analysis filter banks, an analysis filter bank that minimizes a signal to interference ratio (SIR) and a peak to average power ratio (PAPR) of the symbols for transmission;

wherein the at least one processor is further configured to:

map the modulation symbols to the time resources on a time axis at a predetermined interval according to an overlapping factor and a number of the modulation symbols to be transmitted;

map the modulated symbols, mapped to the time resources and filtered by one of the plurality of analysis filter banks, to pre-allocated frequency resources;

select at least one synthesis filter bank of the plurality of the synthesis filter banks, the selected at least one synthesis filter bank configured to recover time domain signals by synthesizing the symbols mapped to the frequency resources; and overlap and sum outputs of the selected at least one synthesis filter bank for transmission.

18. The device of claim 17, wherein the at least one processor is further configured to perform one of quadrature amplitude modulation (QAM) and offset QAM (OQAM).

19. The device of claim 17, wherein the plurality of analysis filter banks perform discrete fourier transform (DFT) operations, and the at least one synthesis filter bank of the plurality of the synthesis filter banks performs an inverse discrete fourier transform (IDFT) operation.

20. The device of claim 17, wherein the at least one processor is further configured to map the symbols to the time resources in association with the overlapping factor of the symbols to transmit and pads zeros in positions to which no symbol is mapped.

* * * * *